United States Patent [19]
Newcomb et al.

[11] Patent Number: 5,562,202
[45] Date of Patent: Oct. 8, 1996

[54] TRACK FOR AUTOMATED CONVEYOR SYSTEM

[75] Inventors: Michael R. Newcomb, Papillion; Kenneth R. Bermel, Omaha, both of Nebr.

[73] Assignee: Lab Interlink, Inc., Omaha, Nebr.

[21] Appl. No.: 275,839

[22] Filed: Jul. 15, 1994

[51] Int. Cl.⁶ ................................................ B65G 21/02
[52] U.S. Cl. ........................................ 198/861.1; 198/860.1
[58] Field of Search ................................ 198/860.1, 860.2, 198/860.3, 861.1

[56] References Cited

U.S. PATENT DOCUMENTS

| | | | |
|---|---|---|---|
| 3,236,363 | 2/1966 | Sutliffe | 198/860.2 X |
| 4,146,126 | 3/1979 | Mattos | 198/861.1 |
| 5,316,134 | 5/1994 | Donohue | 198/860.2 X |
| 5,328,020 | 7/1994 | Clopton | 198/861.1 X |

FOREIGN PATENT DOCUMENTS

| | | | |
|---|---|---|---|
| 0409379 | 1/1991 | European Pat. Off. | 198/860.1 |
| 4106013 | 4/1992 | Japan | 198/860.1 |
| 2183584 | 6/1987 | United Kingdom | 198/861.1 |
| 8400348 | 2/1984 | WIPO | 198/860.1 |

*Primary Examiner*—James R. Bidwell
*Attorney, Agent, or Firm*—Zarley, McKee, Thomte, Voorhees & Sease; Mark D. Frederiksen

[57] ABSTRACT

A conveyor track has a generally U-shaped cross-section with a conveyor operably mounted within the track to transport specimen carriers along the track length. A pair of "J-shaped" legs depend from the lower end of the track and are spaced apart a distance to receive a horizontal support rail therebetween. A fastener apparatus, for fastening the track to the support rail, includes a retainer plate positioned under the support rail and a pair of clip plates connected between the track depending legs and the retainer plate. The support rail has a generally "I-shaped" cross-section with an upper plate, lower plate and vertical web, and extends the length of the track. End caps are provided for the ends of the support rail and for the ends of the conveyor track to retain the fluids within the conveyor track and within the upper and lower channels of the support rail. The conveyor track includes upper and lower channels formed on the outer surfaces of the forward and rearward legs. Auxiliary components for the conveyor track have a pair of hook members which are removably engaged on the upper and lower channels of the forward or rearward leg to support the component on the track. A cover is provided for the conveyor track which has an inverted U-shaped cross-section formed from forward and rearward legs.

30 Claims, 4 Drawing Sheets

TRACK FOR AUTOMATED CONVEYOR SYSTEM

TECHNICAL FIELD

The present invention relates generally to systems for the automation of clinical laboratories and the like, and more particularly to a conveyor track utilized in an automated conveyor system for transporting specimens throughout an automated laboratory.

BACKGROUND OF THE INVENTION

Clinical laboratory testing has changed and improved remarkably over the past 70 years. Initially, tests or assays were performed manually, and generally utilized large quantities of serum, blood or other materials/body fluids. As mechanical technology developed in the industrial work place, similar technology was introduced into the clinical laboratory. With the introduction of new technology, methodologies were also improved in an effort to improve the quality of the results produced by the individual instruments, and to minimize the amount of specimen required to perform a particular test.

More recently, instruments have been developed to increase the efficiency of testing procedures by reducing turnaround time and decreasing the volumes necessary to perform various assays. Present directions in laboratory testing focus on cost containment procedures and instrumentation. Laboratory automation is one area in which cost containment procedures are currently being explored. Robotic engineering has evolved to such a degree that various types of robots have been applied in the clinical laboratory setting.

The main focus of prior art laboratory automation relies on the implementation of conveyor systems to connect areas of a clinical laboratory. Known conveyor systems in the laboratory setting utilize separate conveyor segments to move specimens from a processing station to a specific laboratory work station. In order to obtain cost savings, the specimens were sorted manually, and grouped in a carrier rack to be conveyed to a specific location. In this way, a carrier would move a group of 5–20 specimens from the processing location to the specific work station for the performance of a single test on each of the specimens within the carrier rack.

With the development of new and improved automatic conveyor systems for laboratories and other environments, the inventors herein have found a need for a customized conveyor track and support system for supporting the conveyor track above the ground. Preferably, the track and support system permits flexibility in the arrangement of tracks and "gates" accessing various work stations, as well as simple and economic modules which are easily connected to customize the layout of the particular conveyor system.

In the prior art, conveyor track was conventional directly suspended from a ceiling or a wall support. For this reason, each and every section of conveyor track would necessarily be customized to fit a particular location. In the event of a repair, or other mechanical problem, the entire conveyor track would need to be shut down and the pertinent section removed for repair or replacement. Because of the customized design of each automated conveyor system of the prior art, any replacement pieces would also necessarily be customized.

In the laboratory environment, it is common for the conveyor track to transport various fluid specimens among a plurality of work stations. One problem with prior art designs of conveyor track was in the fact that spillage of such fluid would contaminant the track and the surrounding environment.

SUMMARY OF THE INVENTION

It is therefore a general object of the present invention to provide an improved modular conveyor track for an automated conveyor system.

Another object of the present invention is to provide a conveyor track which will provide for support of various components directly thereon.

Still another object is to provide a conveyor track which includes features for the retention of fluid spillage, and to prevent the escape of fluid which has been spilled.

Yet another object of the present invention is to provide a conveyor track with easily interchangeable pads that may be quickly changed and/or replaced.

These and other objects of the present invention will be apparent to those skilled in the art.

The conveyor track of the present invention has a generally U-shaped cross-section with a conveyor operably mounted within the track to transport specimen carriers or the like along the track length. A pair of "J-shaped" legs depend from the lower end of the track and are spaced apart a distance to receive a horizontal support rail therebetween. A fastener apparatus, for fastening the track to the support rail, includes a retainer plate positioned under the support rail and a pair of clip plates connected between the track depending legs and the retainer plate. A set screw in the retainer plate biases the plate downwardly away from the bottom of the support rail to thereby bias the conveyor track against the top surface of the support rail. A plurality of hangers suspend the support rail from a ceiling above the ground, each hanger having a bar projecting outwardly from the lower end in a sleeve slidably journaled on the bar with set screws to retain the sleeve on the bar. The support rail has a generally "I-shaped" cross-section with an upper plate, lower plate and vertical web. A pair of vertical forward and rearward walls along the forward and rearward edges of the upper plate have inwardly directed lips to form an upper channel above the upper plate. The lower plate includes a pair of forward and rearward walls projecting upwardly to form channels along opposite sides of the web. End caps are provided for the ends of the support rail and for the ends of the conveyor track to retain the fluids within the conveyor track and within the upper and lower channels of the support rail. The conveyor track includes an upper flange projecting outwardly and upwardly from the forward leg to form an upper channel, and a lower flange projecting outwardly and upwardly and spaced below the upper flange to form a lower channel on the forward leg of the conveyor track. A second pair of upper and lower flanges form upper and lower channels on the rearward leg of the conveyor track. Auxiliary components for the conveyor track have a pair of hook members which are removably engaged on the upper and lower channels of the forward or rearward leg to support the component on the track. A cover is provided for the conveyor track which has an inverted U-shaped cross-section formed from forward and rearward legs. The forward and rearward legs of the cover are received in the upper channels of the track and extend continuously from end to end on the track. The upper ends of the track forward and rearward legs include shoulder portions with top surfaces, outer faces and inward faces, extending from end to end on the track. The top surfaces of the shoulder portions are canted inwardly along their length to direct fluid inwardly into the track. The outer faces of the shoulder portions each have a groove extending from end to end which engages a corresponding ridge formed on the inward face at the lower end of the cover forward and rearward legs. The cover ridges and track grooves correspond to form a positive engagement and seal continuously between the cover and track.

DESCRIPTION OF THE PREFERRED EMBODIMENT

Figure 1:
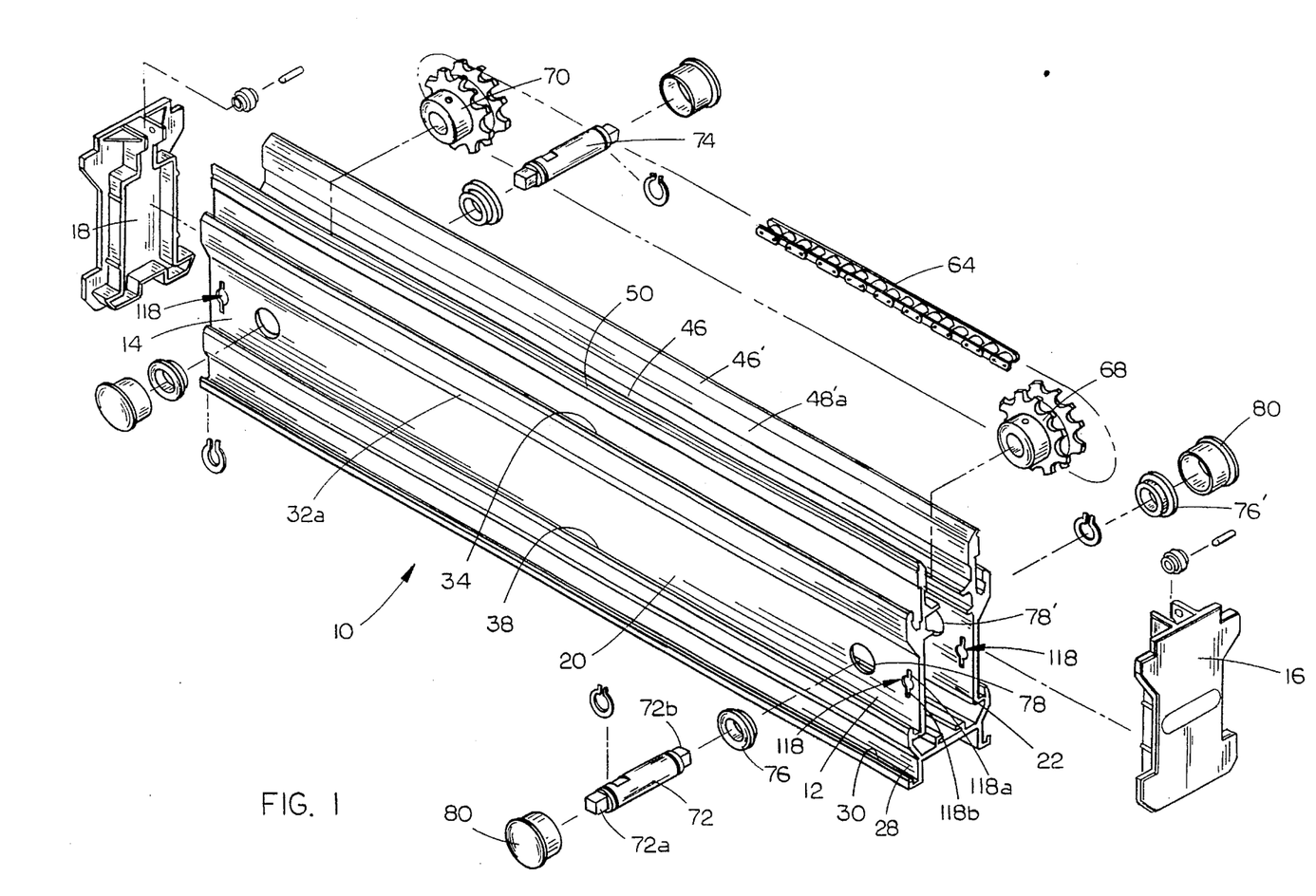
FIG. 1 is an exploded perspective view of the conveyor track of the present invention.

Referring now to the drawings, in which identical or corresponding parts are identified with the same reference numeral, and more particularly to FIG. 1, the conveyor track of the present invention is designated generally at 10 and is preferably formed of extruded aluminum. Track 10 includes right and left longitudinal ends 12 and 14 with end caps 16 and 18 removably and sealably secured thereto, as described hereinbelow in more detail.

Figure 2:
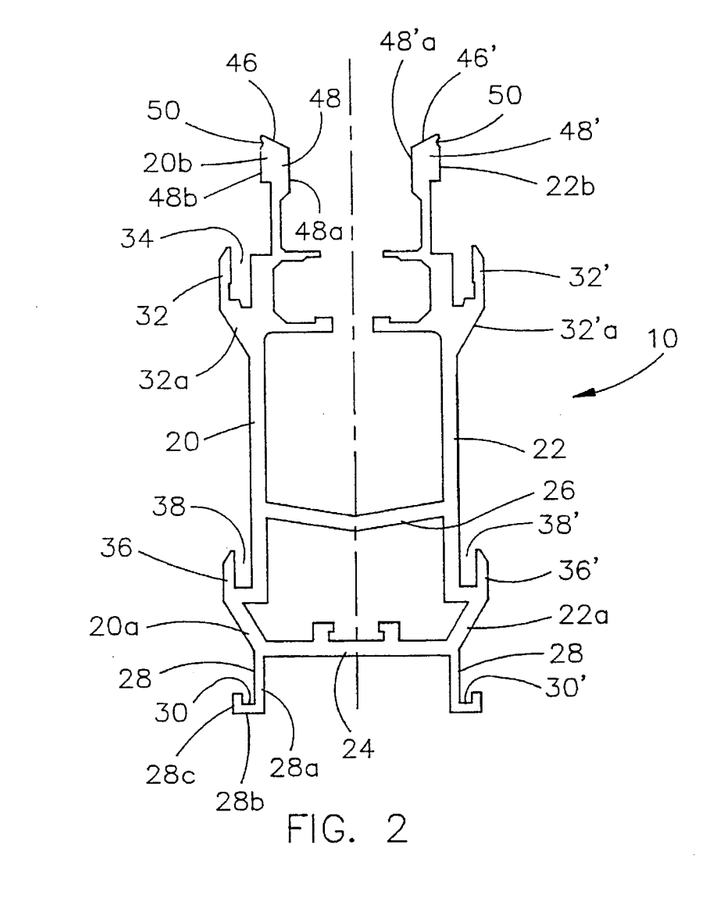
FIG. 2 is an end view of a section of conveyor track.

Referring now to FIG. 2, track 10 has a generally U-shaped cross-section with a forward vertical leg 20 and a rearward vertical leg 22 connected by a generally horizontal base plate 24. A cross-member 26 interconnects the inwardly directed faces of forward and rearward legs 20 and 22, intermittently throughout the length of track section 10. As can be seen in FIG. 2, rearward leg 22 is a mirror image of forward leg 20, taken along a vertical plane extending the longitudinal length of track section 10 intermediate forward and rearward legs 20 and 22. For simplicity, and ease of description, only forward leg 20 will be described in detail, with the corresponding component of the rearward leg being designated in the drawings with a "prime" marking.

Figure 5:
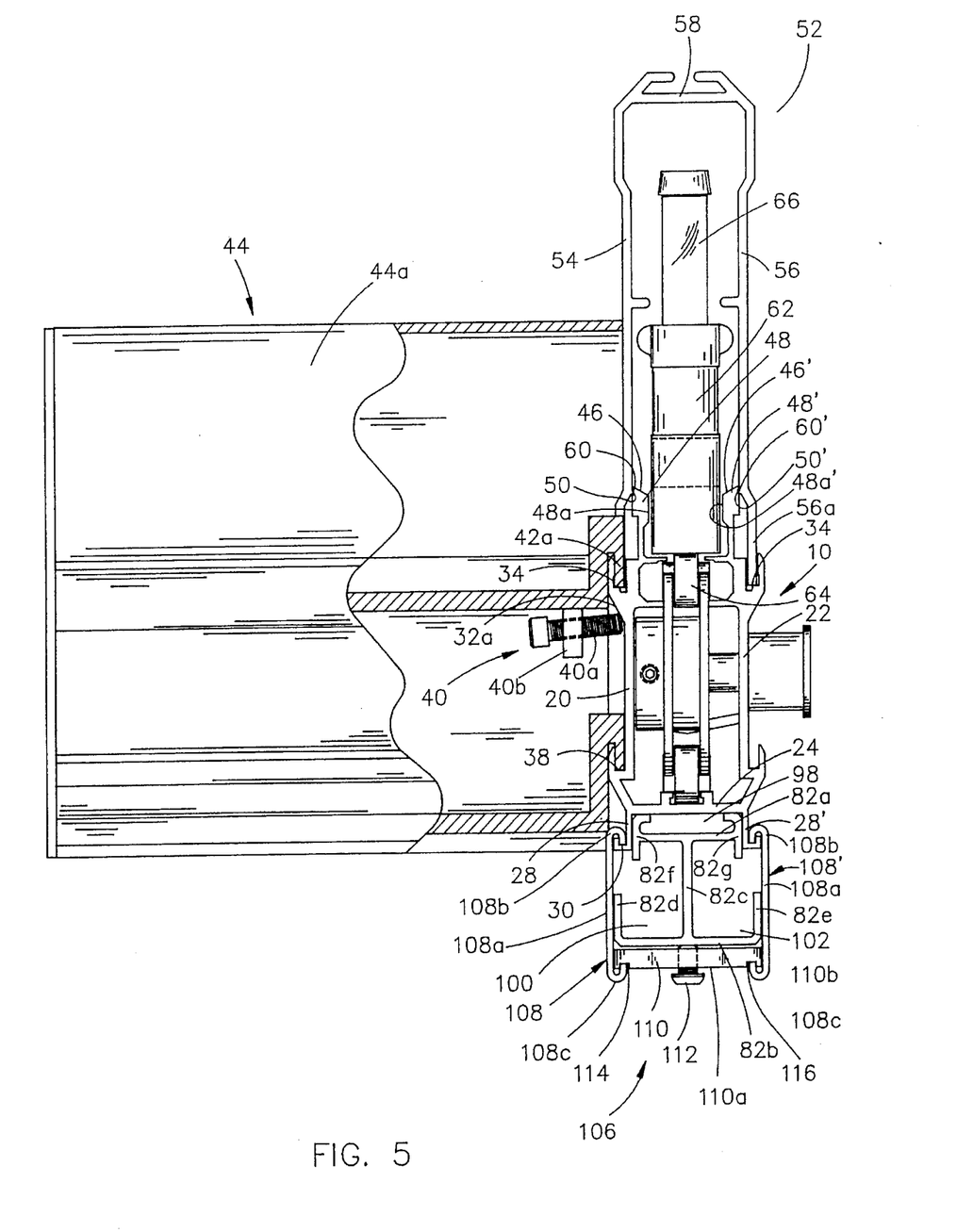
FIG. 5 is an end view of the conveyor track and support system shown in FIG. 4.

A generally J-shaped fastener leg 28 depends from the lower end 20a of forward leg 20, below base plate 24. Fastener leg 28 includes a depending back 28a, a forwardly projecting base 28b and an upwardly projecting lip 28c to form an upwardly directed channel 30. As shown in FIG. 5, channel 30 of fastener leg 28 receives a clip so as to fasten track section 10 to a support rail.

Referring once again to FIG. 2, an upper flange 32 projects forwardly and upwardly from a location spaced below the upper end 20b of forward leg 20. Upper flange 32 thereby forms an upper support channel 34 between flange 32 and the forward face of forward leg 20. A lower flange 36 also projects forwardly and thence upwardly from the forward face of forward leg 20, at a position spaced below upper flange 32 and spaced above base plate 24. Lower flange 36 thereby forms a lower support channel 38 on the forward surface of forward leg 20, spaced below upper support channel 34. As shown in FIG. 5, upper and lower support channels 34 and 38 provide support structure for retaining various components along the forward face of forward leg 20 of track section 10.

Upper flange 32 includes a slanted lower surface 32a extending rearwardly from the forward face of flange 32 to the forward face of leg 20. Slanted surface 32a is formed to cooperate with a fastener 40, shown in FIG. 5, to bias the hook member 42 of a supported auxiliary component 44 with a bolt 40a engaging slanted 32a.

The upper end 20b of forward leg 20 includes an inwardly beveled upper surface 46, formed on an inwardly projecting shoulder 48 having a vertical guide surface 48a. Shoulder 48 also has a outwardly projecting forward surface 48b with a groove 50 extending horizontally along the entire length of forward leg 20.

Referring now to FIG. 5, a removable cover 52 is provided for track 10 and has a generally inverted U-shape, and is formed of a resilient material such as plastic. Cover 52 includes a forward leg 54 and a rearward leg 56 depending from a generally horizontal top plate 58. The lower ends 54a and 56a fit snugly within upper channels 34 and 34' respectively. A small inwardly projecting ridge 60 is formed horizontally along the longitudinal length of forward leg 54 on the interior surface thereof which corresponds with groove 50 on the forward face of shoulder 48, to positively engage forward leg 54 of cover 52 within upper channel 34. A similar ridge 60' formed on the interior surface of rearward leg 56 positively engages groove 50' of shoulder 48' to secure rearward leg 56 in upper support channel 34'. Because cover 52 is formed of a resilient material, it may be easily disengaged by slightly bending legs 54 and 56 to disengage ridges 60 and 60' from grooves 50 and 50'.

FIG. 5 also shows a specimen carrier 62 supported on a roller chain 64 on conveyor track 10. A specimen vial 66 transports a specimen of fluid or other material. As can be seen in FIG. 5, cover 52 forms a cap which is sealably engaged at the interconnection of ridges 60 and 60' with grooves 50 and 50'. Thus, any spillage of fluid or other specimen material from vial 66 is retained within cover 52 and directed inwardly into the interior space of track 10 by upper surfaces 46 and 46'. Because of the U-shaped cross-section of track 10, fluid will be retained within the track section above base plate 24 between forward and rearward leg 20 and 22. End caps 16 and 18, shown in FIG. 1, are shaped to engage and seal the interior cross-sectional shape of track 10, to thereby retain fluid therein.

The interior of cover 52 includes a pair of lips 59 extending the length of cover 52 and diametrically opposing each other. Lips 59 extend inwardly towards one another such that the space between lips 59 is less than the width of the upper end of specimen carrier 62. In this way, any tendency of carrier 62 to tip forwardly or rearwardly is prevented by contact of the upper surface of specimen carrier 62 with lips 59.

In the event that there is spillage from specimen carrier 62 which leaks between specimen cover 52 and the upper end of the track 10, a small fluid channel 61 and 61' is provided in the bottom of each upper channel 34 and 34' respectively. In this way, fluid within upper channels 34 and 34' will not be forced out of the upper channels by the legs of cover 52, but is retained within the fluid channels 61 and 61'.

Figure 3:
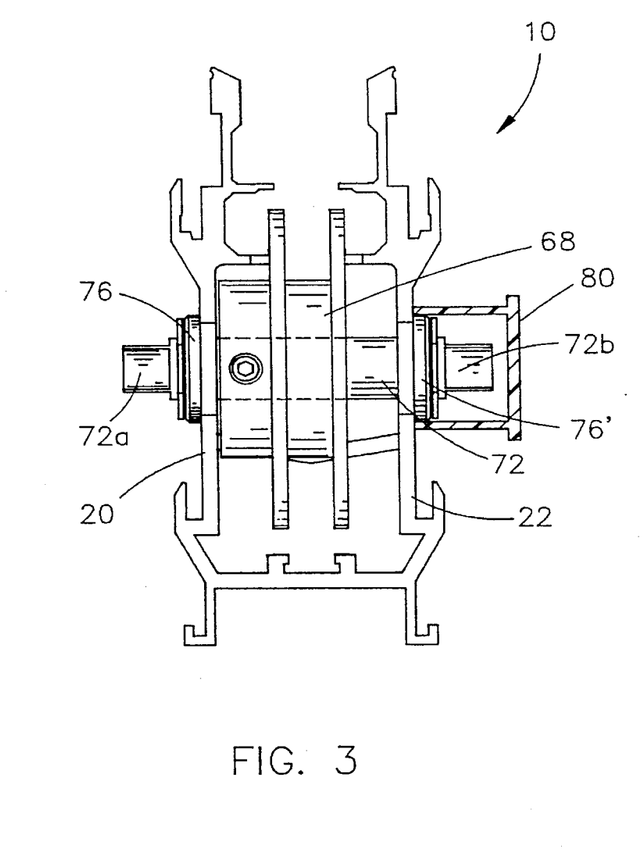
FIG. 3 is a view similar to FIG. 2, but with a drive sprocket mounted therein.

As described in detail above, the upper ends of track forward and rearward legs 20 and 22 include shoulders 48 and 48' with interiorly directed guide surfaces 48a and 48a'. As shown in FIG. 5, guide surfaces 48a and 48a' direct a specimen carrier 62 therebetween as it is transported on roller chain 64. Referring once again to FIG. 1, roller chain 64 is preferably formed in a continuous loop around a pair of sprockets 68 and 70 which are secured to axles 72 and 74 respectively for rotation therewith. Axle 72 is rotatably mounted between a pair of brass bearings 76 and 76' press fit within a pair of opposing apertures 78 and 78' in forward and rearward walls 20 and 22 of track 10, at the right end 12 thereof. Each end of 72a and 72b of axle 72 is formed with a polygonal shape to permit engagement with a drive mechanism or the like. As shown in FIG. 3, ends 72a and 72b project outwardly from track forward and rearward legs 20 and 22. A cap 80 is provided which will engage bearings 76 and 76' so as to cover the projecting ends of axle 72, and thereby prevent accidental contact therewith. Axle 74, as shown in FIG. 1, is similarly mounted in the opposite end 14 of track 10.

Figure 4:
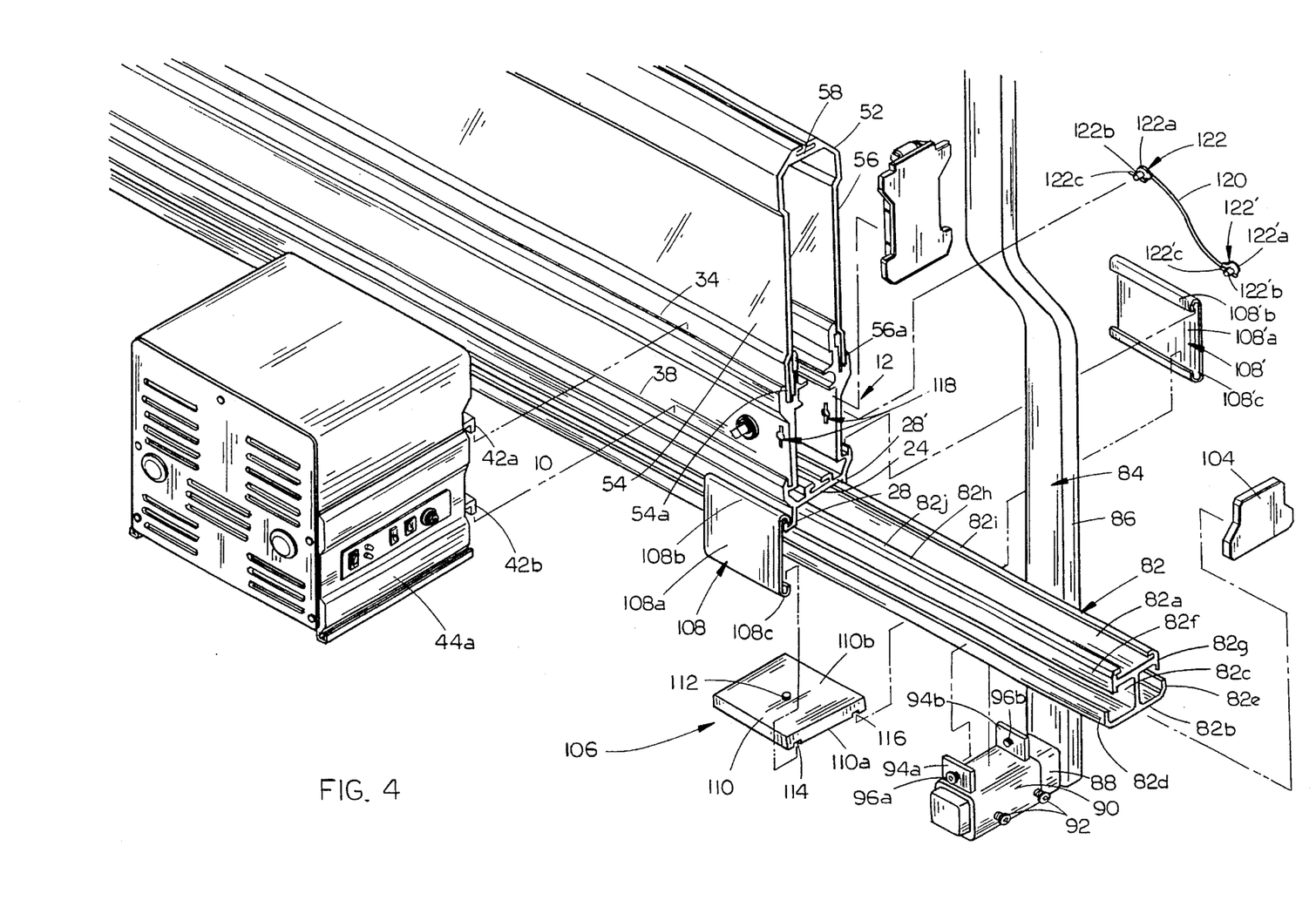
FIG. 4 is an exploded perspective view of the track of the present invention with a support rail and a removable cover.

Referring now to FIG. 4, conveyor track 10 and cover 52 are releasably secured to a support rail 82 which is connected to a plurality of hangers 84 to support the conveyor track 10 above the ground. Each hanger 84 includes an elongated strap 86 with a bar 88 affixed to the forward face of the strap at the lower end thereof. The upper end of strap 86 is engaged with an overhead support, such as a ceiling or other structure.

A tubular sleeve 90 is provided with an interior opening matching the cross-section of bar 88, so as to receive bar 88 therein. A pair of set screws 92 threaded through one side wall of sleeve 90 selectively secure sleeve 90 in the desired position on bar 88. A forward and rearward ear 94a and 94b project upwardly from the upper wall of sleeve 90, and are spaced apart thereon. A set screw 96a is threaded through an aperture in forward ear 94a so as to project rearwardly through forward ear 98a, while a set screw 96b is threaded through an aperture in rearward ear 94b so as to project forwardly through rearward ear 94b. Set screws 96 will retain a section of support rail 82 in removably affixed position between ears 94.

Each rail section 82 has a generally I-shaped cross-section with an upper horizontal plate 82a connected to a lower horizontal plate 82b by a vertical web 82c. Upper plate 82a has a width less than that of lower plate 82b. Lower plate 82b has an upwardly projecting forward wall 82d parallel to web 82c, and an opposing rearward wall 82e projecting upwardly parallel to web 82c and forward wall 82d. Upper plate 82a also has a pair of spaced apart forward and rearward walls 82f and 82g at the forward and rearward ends thereof, oriented parallel to web 82c and located vertically inwardly of lower plate forward and rearward walls 82d and 82e. Upper plate walls 82f and 82g each have an upper lip 82h and 82i, respectively, bent inwardly towards one another to form a pair of coplanar horizontal upper support surfaces 82j.

The design of support rail 82 provides additional advantages when utilized in combination with the conveyor track 10 of the present invention. For example, lower plate forward and rearward walls 82d and 82e provide vertical surfaces against which set screws 96a and 96b are biased to retain rail 82 in position on hanger support sleeve 90. In addition, the upper support surfaces 82j support the base plate 24 of conveyor track 10 while the upper plate forward and rearward walls 82f and 82g are spaced apart a distance to snugly fit between the depending fastener legs 28 and 28' to prevent transverse movement of track 10 on rail 82.

Support rail 82 also includes fluid retention capabilities by virtue of its structural design. As shown in FIG. 5, a channel 98 with an upwardly directed opening is formed by top plate 82a in the upwardly projecting portions of top plate walls 82f and 82g. Channel 98 will thereby retain fluid therein which may leak or spill from track 10. In addition, a pair of channels 100 and 102 are formed on opposing sides of web 82c by lower plate 82b and lower plate walls 82d and 82e. Because upper plate 82a has a width less than lower plate 82b, any fluid spilling over from channel 98 would be retained within lower channels 100 and 102. Channels 100 and 102 also provide passageways for wire and other control cables which may be utilized in conjunction with conveyor track 10.

As shown in FIG. 4, an end cap 104 is provided for the end of a projecting support rail 82, and serves to retain fluid within upper channel 98 and lower channels 100 and 102.

FIGS. 4 and 5 show a connector apparatus 106 utilized to connect and secure the conveyor track 10 to support rail 82. Connector apparatus 106 includes a forward and rearward clip plate 108 and 108' and a retainer plate 110 with a set screw 112 threaded upwardly therethrough.

Each retainer plate 110 is a generally square-shaped member with a pair of spaced apart and parallel forward and rearward slots 114 and 116 formed in the bottom surface 110a thereof. Set screw 112 is threaded through an aperture formed generally centrally in retainer plate 110 with the screw shank projecting through the upper surface 110b of retainer plate 110, and the head projecting below the lower surface 110a.

Clip plate 108 has a generally vertical and flat back 108a with hook-shaped upper and lower ends 108b and 108c. The upper hook end 108b is hooked into channel 30 formed by fastener leg 28, and the lower hook end 108c is hooked into forward slot 114 when retainer plate 110 is positioned against the bottom surface of rail lower plate 82b. Rearward plate 108' is connected in the same fashion to rearward fastener leg channel 30' and retainer plate rearward slot 116, as shown in FIG. 5. Set screw 112 is then threaded upwardly against the bottom surface of rail lower plate 82b to force retainer plate 110 downwardly thereby causing a gripping force to secure track 10 to rail 82.

FIGS. 4 and 5 show an auxiliary component 44 which is utilized in conjunction with conveyor track 10. Auxiliary component 44 includes a housing 44a with a pair of upper and lower hook members 42a and 42b projecting from one end of housing 44a. Hook members 42a and 42b are received within upper and lower support channels 34 and 38 such that auxiliary component 44 hangs from the side of conveyor track 10. In order to secure the component in position, a fastener 40 includes a bolt 40a threaded through a depending flange 40b such that the threaded shank of bolt 40a engages slanted surface 32a of upper flange 32 on forward leg 20 of track 10. Threading bolt 40a inwardly against slanted surface 32a forces hook member 42a downwardly into channel 34 as well as slightly outwardly to positively engage and retain auxiliary component 44 in position.

Referring once again to FIG. 1, each end 12 and 14 of forward and rearward legs 20 and 22 of track 10 have a pair of oppositely disposed apertures 118 formed therethrough. Each aperture 118 preferably includes a vertical slot portion 118a with an enlarged circular portion 118b centered in the slot 118a. A safety chain 120 is provided, as shown in FIG. 4, with opposing end fasteners 122 and 122' designed for selective securement in aperture 118.

End fastener 122 includes a flat base 122a with a projecting shaft 122b having a diameter for receipt through circular portion 118b of aperture 118. A pin 122c is mounted transversely on the end of shaft 122b, generally parallel to the portion of chain 120 connected to base 122a. Similarly, end fastener 122' includes a base 122'a, shaft 122'b and pin 122'c. Pin 122'c is also oriented parallel to the portion of chain 120 mounted to base 122'a.

A safety chain 120 is connected between abutting ends of two lengths of track to retain the ends in close proximity in the event of a failure of the support rail 82, or other calamity, thereby preventing loss of specimen carriers and specimen material which may be present on the track during such an event. To connect and disconnect the safety chain 120, each end fastener 122 and 122' is rotated so as to orient pins 122c and 122'c in a vertical position. Each pin is then inserted through an aperture 118 in the adjacent ends of two lengths of track 10. In the event of separation of the ends of the adjacent tracks, chain 120 will be pulled taut, thereby rotating pins 122c and 122'c to a generally horizontal position, and preventing accidental removal of the end fasteners 122 and 122' from their respective apertures 118.

Whereas the invention has been shown and described in connection with the preferred embodiment thereof, it will be understood that many modifications, substitutions and additions may be made which are within the intended broad scope of the appended claims.

We claim:

1. A track for a conveyor system, comprising:

an elongated length of track having first and second longitudinal ends, upper and lower ends, and a generally "U-shaped" transverse cross-section with a generally horizontal base plate connecting lower ends of spaced apart generally vertical forward and rearward leg members;

a conveyor operably mounted in said track with a selectively movable transport surface adjacent the upper end of said track;

a generally horizontal support rail positioned under said track base plate for supporting said track above the ground;

means on the lower end of said track for removably securing the track to said rail; and means removably connected to one longitudinal end of said track length for selectively securing said track length to a second track length;

said means for selectively securing said track length to a second track length including:
a flexible chain having first and second ends;
a first end fastener on the chain first end for removably connecting the chain to one end of the first track length; and
a second end fastener on the chain second end for removably connecting the chain to one end of an adjacent second track length.

2. The conveyor track of claim 1, wherein said first and second end fasteners include means for preventing disconnection of the fasteners from their respective track ends when the track lengths are separated, and for permitting selective disconnection of the end fasteners from their respective track ends when the track lengths are in longitudinal abutting contact.

3. A track for a conveyor system comprising:

an elongated length of track having first and second longitudinal ends, upper and lower ends, and a generally "U-shaped" transverse cross-section with a generally horizontal base plate connecting lower ends of spaced apart generally vertical forward and rearward leg members;

a conveyor operably mounted in said track with a selectively movable transport surface adjacent the upper end of said track;

a generally horizontal support rail positioned under said track base plate for supporting said track above the ground; and means on the lower end of said track for removably securing the track to said rail;

said means for removably securing the track length to the support rail including:
a forward fastener leg depending from the lower end of said track forward leg;
a rearward fastener leg depending from the lower end of said track rearward leg; and
fastener means for connecting said forward and rearward fastener legs to said support rail.

4. The conveyor track of claim 3, wherein said forward fastener leg has a generally "J-shaped" cross-section and forms an upwardly open channel extending the length of the track, and wherein said rearward fastener leg has a generally "J-shaped" cross-section and forms an upwardly open channel extending the length of the track.

5. The conveyor track of claim 4, wherein said fastener means includes:

a retainer plate positioned under a portion of said support rail, said retainer plate including forward and rearward edges and upper and lower surfaces;

a forward clip plate having a lower end connected to the retainer plate forward edge, and an upper end engaging said forward fastener leg channel; and a rearward clip plate having a lower end connected to the retainer plate rearward edge, and an upper end engaging said rearward fastener leg channel.

6. The conveyor track of claim 5, wherein said rail has an upper support surface and a lower surface, and further comprising biasing means for biasing the retainer plate downwardly away from the lower surface of the rail, whereby said track will be biased into engagement with the upper support surface of the rail.

7. The conveyor track of claim 6, wherein said biasing means includes a set screw with a head portion and threaded shank, the shank threaded through an aperture in the retainer plate into engagement with the lower surface of the rail, and the set screw head portion projecting from the bottom surface of the retainer plate.

8. The conveyor track of claim 5, wherein said forward and rearward clip plate upper ends are generally hook-shaped to engage the fastener leg forward and rearward leg channels.

9. The conveyor track of claim 8, wherein:

said retainer plate includes a forward slot formed in the bottom surface thereof parallel and adjacent the forward edge, and a rearward slot formed in the bottom surface thereof parallel and adjacent the rearward edge;

said forward and rearward clip plate lower ends are generally hook-shaped and engaged with said retainer plate forward and rearward slots respectively.

10. The conveyor track of claim 9, wherein said rail has an upper support surface and a lower surface, and further comprising biasing means for biasing the retainer plate downwardly away from the lower surface of the rail, whereby said track will be biased into engagement with the upper support surface of the rail.

11. The conveyor track of claim 10, wherein said biasing means includes a set screw with a head portion and threaded shank, the shank threaded through an aperture in the retainer plate into engagement with the lower surface of the rail, and the set screw head portion projecting from the bottom surface of the retainer plate.

12. A track for a conveyor system, comprising:
- an elongated length of track having first and second longitudinal ends, upper and lower ends, and a generally "U-shaped" transverse cross-section with a generally horizontal base plate connecting lower ends of spaced apart generally vertical forward and rearward leg members;
- a conveyor operably mounted in said track with a selectively movable transport surface adjacent the upper end of said track;
- a generally horizontal support rail positioned under said track base plate for supporting said track above the ground;
- means on the lower end of said track for removably securing the track to said rail; and
- a hanger removably connected to said rail for supporting the rail above the ground;
- said hanger including:
  - a generally vertical strap having upper and lower ends and forward and rearward faces;
  - a bar projecting forwardly from the lower end of said strap; and
  - means for removably connecting said rail to said bar for supporting said rail on said hanger including:
    - a sleeve slidably journaled on said bar;
    - said sleeve having means for removably retaining said rail on the sleeve; and
    - said sleeve further including means for selectively preventing slidable movement of the sleeve on the bar.

13. The conveyor track of claim 12, wherein said means for selectively preventing slidable movement includes a set screw threaded through a wall of the sleeve for selective biasing engagement with said bar.

14. The conveyor track of claim 12, wherein said means for removably retaining said rail includes:
- a pair of spaced apart ears projecting upwardly from said sleeve;
- said rail lower plate removably journaled between said ears; and
- restraining means for selectively restraining said rail between said ears.

15. A track for a conveyor system, comprising:
- an elongated length of track having first and second longitudinal ends, upper and lower ends, and a generally "U-shaped" transverse cross-section with a generally horizontal base plate connecting lower ends of spaced apart generally vertical forward and rearward leg members;
- a conveyor operably mounted in said track with a selectively movable transport surface adjacent the upper end of said track;
- a generally horizontal support rail positioned under said track base plate for supporting said track above the ground;
- means on the lower end of said track for removably securing the track to said rail;
- said support rail including opposing longitudinal ends and a generally "I-shaped" cross-section, with a horizontal upper plate connected to a horizontal lower plate by a vertical web;
- said conveyor track supported on a horizontal planar support surface forming an uppermost end of the rail.

16. A track for a conveyor system, comprising:
- an elongated length of track having first and second longitudinal ends, upper and lower ends, and a generally "U-shaped" transverse cross-section with a generally horizontal base plate connecting lower ends of spaced apart generally vertical forward and rearward leg members;
- a conveyor operably mounted in said track with a selectively movable transport surface adjacent the upper end of said track;
- a generally horizontal support rail positioned under said track base plate for supporting said track above the ground; and
- means on the lower end of said track for removably securing the track to said rail;
- said support rail including opposing longitudinal ends and a generally "I-shaped" cross-section, with a horizontal upper plate connected to a horizontal lower plate by a vertical web;
- said conveyor track supported on a horizontal planar support surface forming an uppermost end of the rail;
- said rail having a length greater than the length of the conveyor track supported thereon;
- said rail lower plate including a forward longitudinal edge and a rearward longitudinal edge; and
- a forward wall projecting upwardly continuously along the lower plate forward edge and a rearward wall projecting upwardly continuously along the lower plate rearward edge.

17. The conveyor track of claim 16, wherein said rail upper plate includes a forward longitudinal edge and a rearward longitudinal edge, and further comprising:
- a forward wall with a wall portion projecting upwardly continuously along the upper plate forward edge;
- a rearward wall with a portion projecting upwardly continuously along the upper plate rearward edge;
- a forward lip projecting rearwardly continuously along an upper edge of the upper plate forward wall and having an upper planar surface; and
- a rearward lip projecting forwardly continuously along an upper edge of the upper plate rearward wall and having an upper planar surface coplanar with the forward lip upper surface;
- wherein said rail planar support surface is formed by said forward and rearward lip upper surfaces.

18. The conveyor track of claim 17, wherein said lower plate forward and rearward walls are spaced apart a distance greater than the upper plate forward and rearward walls.

19. The conveyor track of claim 18, further comprising end caps for sealing the ends of said rail, each end cap including a lower wall portion extending from the lower plate upwardly a height at least equal to the height of the lower plate forward and rearward walls and extending transversely therebetween, and each end cap including an upper wall portion extending from the upper plate upwardly at least to the lip upper surfaces and transversely between said upper plate forward and rearward walls.

20. A track for a conveyor system, comprising:
- an elongated length of track having first and second longitudinal ends, upper and lower ends, and a generally "U-shaped" transverse cross-section with a generally horizontal base plate connecting lower ends of spaced apart generally vertical forward and rearward leg members;
- a conveyor operably mounted in said track with a selectively movable transport surface adjacent the upper end of said track;

a generally horizontal support rail positioned under said track base plate for supporting said track above the ground; and means on the lower end of said track for removably securing the track to said rail;

said support rail including opposing longitudinal ends and a generally "I-shaped" cross-section, with a horizontal upper plate connected to a horizontal lower plate by a vertical web;

said conveyor track supported on a horizontal planar support surface forming an uppermost end of the rail;

said rail being at least as long as the conveyor track supported thereon;

said rail upper plate including a forward longitudinal edge and rearward longitudinal edge;

a forward wall with a wall portion projecting upwardly continuously along the upper plate forward edge;

a rearward wall with a portion projecting upwardly continuously along the upper plate rearward edge;

a forward lip projecting rearwardly continuously along an upper edge of the upper plate forward wall and having an upper planar surface; and a rearward lip projecting forwardly continuously along an upper edge of the upper plate rearward wall and having an upper planar surface coplanar with the forward lip upper surface;

wherein said rail planar support surface is formed by said forward and rearward lip upper surfaces.

21. A conveyor track for a conveyor system, comprising:

an elongated length of track having first and second longitudinal ends, upper and lower ends, in a generally "U-shaped" transverse cross-section with a generally horizontal base plate connecting lower ends of spaced apart generally vertical forward and rearward left members;

a conveyor operably mounted in said track with a selectively movable transport surface adjacent the upper end of said track;

a flange projecting outwardly and thence upwardly from the forward left of said track to form a generally horizontal upwardly open channel located intermediate the upper and lower ends of the forward leg and extending the length of said track;

a second flange projecting outwardly and thence upwardly from the forward leg of the track to form a second upwardly open channel spaced below and generally parallel to the first channel, and extending the length of said track; and an auxiliary component selectively removably attached to said track, said auxiliary component including an upper hook member removably engaged on said upper channel, and a lower hook member removably engaged on said lower channel, to support said auxiliary component on said track forward leg.

22. The conveyor track of claim 21, wherein said upper flange includes a slanted surface extending rearwardly and downwardly from an upper flange forward surface to said forward leg, and further comprising biasing means on said auxiliary component for selectively engaging said slanted surface to bias said upper hook member downwardly into the upper channel.

23. A conveyor track for a conveyor system, comprising:

an elongated length of track having first and second longitudinal ends, upper and lower ends, in a generally "U-shaped" transverse cross-section with a generally horizontal base plate connecting lower ends of spaced apart generally vertical forward and rearward leg members;

a conveyor operably mounted in said track with a selectively movable transport surface adjacent the upper end of said track;

a flange projecting outwardly and thence upwardly from the forward left of said track to form a generally horizontal upwardly open channel located intermediate the upper and lower ends of the forward left and extending the length of said track;

a flange projecting outwardly and thence upwardly from the rearward left of said track to form an upwardly open channel parallel to the forward leg channel and diametric thereto; and a cover removably connected to the upper end of said track and extending the length thereof, said cover having first and second longitudinal ends, upper and lower ends, and a generally inverted "U-shaped" transverse cross-section with a generally horizontal top plate connecting upper ends of spaced apart generally vertical forward and rearward leg members.

24. The conveyor track of claim 23, wherein said cover forward leg has a lower end removably and continuously engaged with said track forward leg channel, and wherein said cover rearward leg has a lower end removably and continuously engaged with said track rearward leg channel.

25. The conveyor track of claim 24, wherein:

said track forward and rearward leg upper ends each include a shoulder portion extending from the first to the second end of the track;

said shoulder portions each including a top surface, an outer face, and an inward face, extending longitudinally from end to end;

said shoulder portions located inwardly and in contact with the forward and rearward legs of the cover, when the cover is engaged on the track.

26. The conveyor track of claim 25, wherein shoulder portion top surfaces are canted toward one another along their lengths, to direct fluid towards the interior of the track between the track forward and rearward legs.

27. The conveyor track of claim 25, further comprising means on said cover and said track for selectively engaging the cover in position on the track and preventing vertical movement of the cover legs from the track channels.

28. The conveyor track of claim 27, oriented means for selectively engaging the cover in position on the track includes:

each shoulder portion outer surface including a generally horizontal groove formed therein extending the longitudinal length of the track;

said cover forward leg having a horizontal ridge projecting inwardly from an inward face thereof spaced above the lower end and extending from end to end, for cooperable engagement with said track forward leg shoulder groove; and said cover rearward leg having a horizontal ridge projecting inwardly from an inward face thereof spaced above the lower end and extending from end to end, for cooperable engagement with said track rearward leg shoulder groove.

29. The conveyor track of claim 25, wherein said shoulder portions are located spaced above said conveyor transport surface and said shoulder interior surfaces project inwardly with generally vertical guide surfaces to guide specimen carriers transported by the conveyor.

30. The conveyor track of claim 23, wherein said cover leg members each have an inward face, and further comprising:

a first lip projecting inwardly from the inward face of the forward leg;

said first lip extending parallel to the upper end of said track and extending continuously between the longitudinal ends of said cover;

said first lip located vertically between upper and lower ends of the forward leg; and     a second lip projecting inwardly from the inward face of the rearward leg, parallel and directly opposite the first lip;

said second lip extending continuously between the longitudinal ends of said cover.

* * * * *